United States Patent
Arase et al.

(10) Patent No.: US 10,077,977 B2
(45) Date of Patent: Sep. 18, 2018

(54) METHOD AND JIG FOR MEASURING ANGLE

(71) Applicant: MITSUBISHI HITACHI POWER SYSTEMS, LTD., Kanagawa (JP)

(72) Inventors: Kenichi Arase, Yokohama (JP); Masayuki Arisato, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 292 days.

(21) Appl. No.: 15/115,029

(22) PCT Filed: Mar. 11, 2015

(86) PCT No.: PCT/JP2015/057140
§ 371 (c)(1),
(2) Date: Jul. 28, 2016

(87) PCT Pub. No.: WO2015/137394
PCT Pub. Date: Sep. 17, 2015

(65) Prior Publication Data
US 2016/0341535 A1 Nov. 24, 2016

(30) Foreign Application Priority Data
Mar. 13, 2014 (JP) .................................. 2014-050601

(51) Int. Cl.
*G01B 5/24* (2006.01)
*F04D 29/56* (2006.01)
(Continued)

(52) U.S. Cl.
CPC ............. *G01B 5/24* (2013.01); *F01D 17/162* (2013.01); *F04D 27/001* (2013.01);
(Continued)

(58) Field of Classification Search
CPC ... G01B 5/14; G01B 5/20; G01B 5/24; G01B 3/56
(Continued)

(56) References Cited

U.S. PATENT DOCUMENTS

| 4,718,172 A * | 1/1988 | Rouse | ....................... G01B 5/24 33/530 |
| 8,196,305 B1 * | 6/2012 | Hansen | ................ G01B 5/0004 33/530 |

(Continued)

FOREIGN PATENT DOCUMENTS

| CN | 102667070 | 9/2012 |
| FR | 2 904 669 | 2/2008 |

(Continued)

OTHER PUBLICATIONS

International Search Report dated Jun. 9, 2015 in International Application No. PCT/JP2015/057140 (with English translation).

(Continued)

*Primary Examiner* — Yaritza Guadalupe-McCall
(74) *Attorney, Agent, or Firm* — Wenderoth, Lind & Ponack, L.L.P.

(57) ABSTRACT

This angle measurement method is a method of measuring an angle of a variable vane of an axial flow fluid machine including a vane main body which is disposed inside of a casing, and an arm which is disposed outside of the casing and rotates integrally with the vane main body, and includes: a jig mounting step of mounting a measurement jig configured to measure an angle of the vane main body on the arm in a fixed posture in a rotation direction of the arm; and a measurement step of measuring a relative angle between a predetermined angle reference surface intersecting the rotation direction of the arm and at least a portion of the measurement jig.

2 Claims, 7 Drawing Sheets

(51) Int. Cl.
  *F04D 29/64* (2006.01)
  *F04D 27/00* (2006.01)
  *F01D 17/16* (2006.01)
(52) U.S. Cl.
  CPC ......... *F04D 29/563* (2013.01); *F04D 29/644* (2013.01); *F05D 2260/83* (2013.01); *F05D 2270/821* (2013.01)
(58) Field of Classification Search
  USPC .................................................... 33/1 N, 534
  See application file for complete search history.

(56) References Cited

U.S. PATENT DOCUMENTS

| | | | | |
|---|---|---|---|---|
| 8,857,070 | B2* | 10/2014 | Niederbremer | ....... F01D 17/162 33/1 N |
| 2005/0079046 | A1 | 4/2005 | Jolibois et al. | |
| 2009/0021247 | A1* | 1/2009 | Braun | .................. F01D 17/162 324/207.25 |
| 2010/0030514 | A1* | 2/2010 | Lange | ................... F01D 21/003 702/156 |
| 2012/0249129 | A1* | 10/2012 | Niederbremer | ....... F01D 17/162 324/207.25 |
| 2016/0341535 | A1* | 11/2016 | Arase | .................... F04D 27/001 |

FOREIGN PATENT DOCUMENTS

| | | |
|---|---|---|
| JP | 8-21703 | 1/1996 |
| JP | 2012-87785 | 5/2012 |
| JP | 2012-117524 | 6/2012 |
| JP | 2013-513759 | 4/2013 |
| WO | 99/50533 | 10/1999 |

OTHER PUBLICATIONS

Written Opinion of the International Searching Authority dated Jun. 9, 2015 in International Application No. PCT/JP2015/057140.

* cited by examiner

METHOD AND JIG FOR MEASURING ANGLE

TECHNICAL FIELD

The present invention relates to an angle measurement method and an angle measurement jig.

Priority is claimed on Japanese Patent Application No. 2014-050601, filed Mar. 13, 2014, the content of which is incorporated herein by reference.

BACKGROUND ART

In a gas turbine or a turbo refrigerator, an axial flow compressor which is a type of axial flow fluid machine is used in order to compress gas. Among this type of axial flow fluid machine, there is an axial flow fluid machine including a plurality of variable vanes that are annularly disposed around a rotor, and a variable vane drive device which changes the directions of these variable vanes.

In Patent Document 1, in a compressor in which a stator vane is disposed inside of a casing, the stator vane is fixed to an arm which is disposed outside of the casing. A member such as a unison ring is connected to a plurality of arms. In Patent Document 1, the movements of the arms in each stage are synchronized by rotating the member such as a unison ring around the casing with an actuator.

Patent Document 2 discloses a nozzle system including a rotatable vane between an inner shroud and an outer shroud. The nozzle system of Patent Document 2 includes a shaft member which extends from a surface of a flange member of a vane extension journal. The shaft member is operatively coupled to an actuator.

CITATION LIST

Patent Documents

[Patent Document 1] Japanese Unexamined Patent Application, First Publication No. 2012-087785
[Patent Document 2] Japanese Unexamined Patent Application, First Publication No. 2012-117524

SUMMARY OF INVENTION

Technical Problem

With respect to the variable vane described above, there is a case where at the time of assembly inspection, maintenance, or the like, whether or not a vane main body is at a correct vane angle is checked. However, the vane main body is disposed inside of a casing. For this reason, in order to access the vane main bodies of the variable vanes which are provided at particularly the second stage and subsequent stages, it is necessary to open the casing. In a case of opening the casing, the burden on a worker who inspects the vane angle of the vane main body increases. In addition to this, due to opening of the casing, the number of regular inspection days significantly increases, and thus stoppage periods of a plant using an axial flow compressor are prolonged.

The present invention provides an angle measurement method and an angle measurement jig which make it possible to easily measure a vane angle of a variable vane and thus to reduce the burden on a worker.

Solution to Problem

According to a first aspect of the present invention, an angle measurement method is a method of measuring an angle of a variable vane of an axial flow fluid machine including a vane main body which is disposed inside of a casing, and an arm which is disposed outside of the casing and rotates integrally with the vane main body. This angle measurement method includes a jig mounting step of mounting a measurement jig configured to measure an angle of the vane main body on the arm in a fixed posture in a rotation direction of the arm. This angle measurement method further includes a measurement step of measuring a relative angle between a predetermined angle reference surface intersecting the rotation direction of the arm and at least a portion of the measurement jig.

According to a second aspect of the present invention, in the measurement step in the angle measurement method according to the first aspect, a gap between a facing part of the measurement jig, which comes into contact with the predetermined angle reference surface intersecting the rotation direction of the arm and is parallel thereto in a case where there is no deviation of a vane angle in the vane main body, and the angle reference surface may be measured.

According to a third aspect of the present invention, an angle measurement jig is a jig for measuring an angle of a variable vane of an axial flow fluid machine including a vane main body which is disposed inside of a casing, and an arm which is disposed outside of the casing and rotates integrally with the vane main body. This angle measurement jig includes a guide part which is capable of being mounted on the arm in a fixed posture in at least a rotation direction of the arm. This angle measurement jig further includes a facing part which comes into contact with a predetermined angle reference surface intersecting the rotation direction of the arm and is parallel thereto in a case where there is no deviation of a vane angle in the vane main body.

According to a fourth aspect of the present invention, the facing part in the angle measurement jig according to the third aspect may include a side or a surface which comes into contact with the angle reference surface and is parallel thereto in a case where there is no deviation of a vane angle in the vane main body.

Advantageous Effects of Invention

According to the angle measurement method and the angle measurement jig described above, the vane angle of the variable vane can be easily measured, and thus it is possible to reduce a burden on a worker. According to the angle measurement method and the angle measurement jig described above, a significant increase in the number of regular inspection days due to opening a casing can be prevented, and thus it becomes possible to shorten stoppage periods of a plant using an axial flow compressor.

DESCRIPTION OF EMBODIMENTS

Hereinafter, an angle measurement method and an angle measurement jig according to an embodiment of the present invention will be described based on the drawings. In this embodiment, a case where the angle measurement method and the angle measurement jig according to the present invention are applied to an axial flow compressor which is an axial flow fluid machine will be described as an example.

Figure 1:
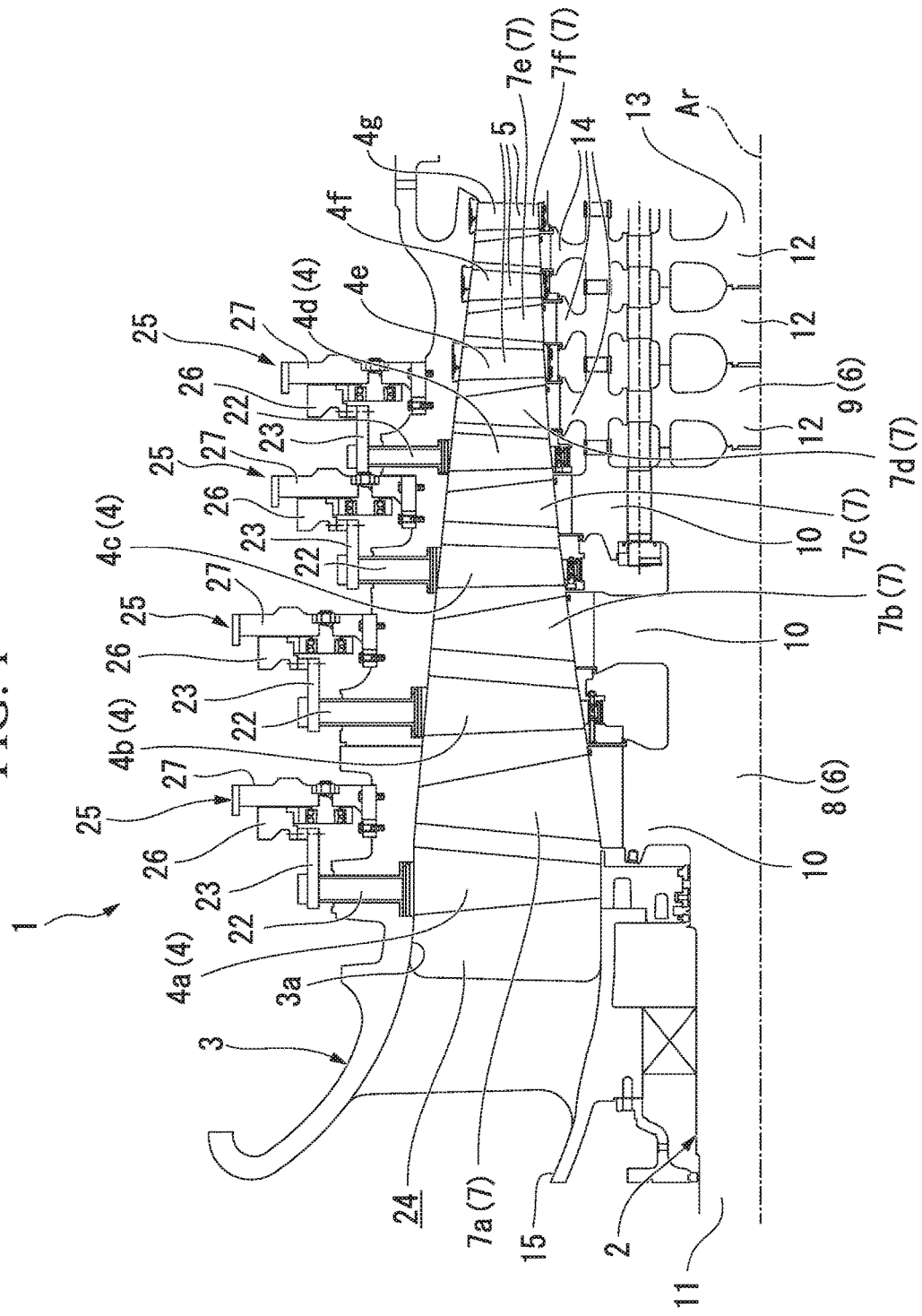
FIG. 1 is a sectional view showing a main section of an axial flow compressor in an embodiment of the present invention.

FIG. 1 is a sectional view showing a main section of an axial flow compressor in this embodiment.

As shown in FIG. 1, an axial flow compressor 1 in this embodiment includes a rotor 2, a casing 3, and vanes 4 and 5.

The rotor 2 is supported in the casing 3 and the like so as to be rotatable around an axis (hereinafter referred to as an axis Ar) thereof. The rotor 2 includes a rotor main body 6 and a plurality of blades 7.

The rotor main body 6 includes an integrated disk part 8 and a split disk part 9.

The integrated disk part 8 is formed by integrating a plurality of rotor disks. The integrated disk part 8 is provided with a plurality of large-diameter portions 10 at intervals in a direction of the axis Ar. The integrated disk part 8 is disposed on the first end portion 11 side in the direction of the axis Ar of the rotor 2.

The split disk part 9 is formed by stacking a plurality of rotor disks 12 in the direction of the axis Ar. The split disk part 9 is disposed on the second end portion 13 side in the direction of the axis Ar. The split disk part 9 is fixed to the integrated disk part 8 described above, by bolts or the like. An outer peripheral portion 14 of each rotor disk 12 in the split disk part 9 is equivalent to the large-diameter portion 10 of the integrated disk part 8 described above.

The blade 7 is provided at each of the large-diameter portion 10 and the rotor disk 12 of the rotor main body 6. More specifically, the plurality of blades 7 radially extend toward the outside in a radial direction from the respective large-diameter portions 10 and the outer peripheral portions 14 of the rotor disks 12. These blades 7 are provided in multiple stages at intervals in the direction of the axis Ar.

The casing 3 is formed in the form of a tube covering the rotor 2 from the outer periphery side. The casing 3 includes a suction port 15 which suctions the outside air, on the first end portion 11 side in the direction of the axis Ar. Further, the casing 3 includes a discharge port (not shown) which discharges compressed gas, on the second end portion 13 side opposite to the first end portion 11 side in the direction of the axis Ar. Here, among the plurality of blades 7 described above, the blades 7 disposed on the side nearest the suction port 15 form a first blade stage 7a. Further, the blades 7 adjacent to the first blade stage 7a from the discharge port side in the direction of the axis Ar (in other words, from the second end portion 13 side in the direction of the axis Ar) form a second blade stage 7b. Then, in the same manner, a third blade stage 7c, a fourth blade stage 7d, . . . , and an n-th blade stage 7n are sequentially disposed toward the discharge port side.

The vanes 4 or the vanes 5 are disposed on the suction port 15 side of each of the first blade stage 7a to the n-th blade stage 7n. A first vane stage 4a is formed by a plurality of vanes 4 disposed on the suction port 15 side of the first blade stage 7a. Further, a second vane stage 4b is formed by a plurality of vanes 4 disposed on the suction port 15 side of the second blade stage 7b. Then, in the same manner, each of a third vane stage 4c, a fourth vane stage 4d, . . . , and an n-th vane stage 4n is formed by a plurality of vanes 4 disposed on the suction port 15 side in the direction of the axis of each of the third blade stage 7c, the fourth blade stage 7d, . . . , and the n-th blade stage 7n.

In the axial flow compressor 1 in this embodiment, each vane 4 from the first vane stage 4a to the fourth vane stage 4d is made such that a vane angle thereof can be adjusted. Further, in the axial flow compressor 1 in this embodiment, the vanes 5 forming the fifth vane stage 4e and subsequent vane stages are fixed such that a vane angle thereof cannot be adjusted. In other words, the vane 4 is a variable vane, and the vane 5 is a fixed vane. Further, the first vane stage 4a described above functions as a so-called inlet guide vane (IGV).

Figure 2:
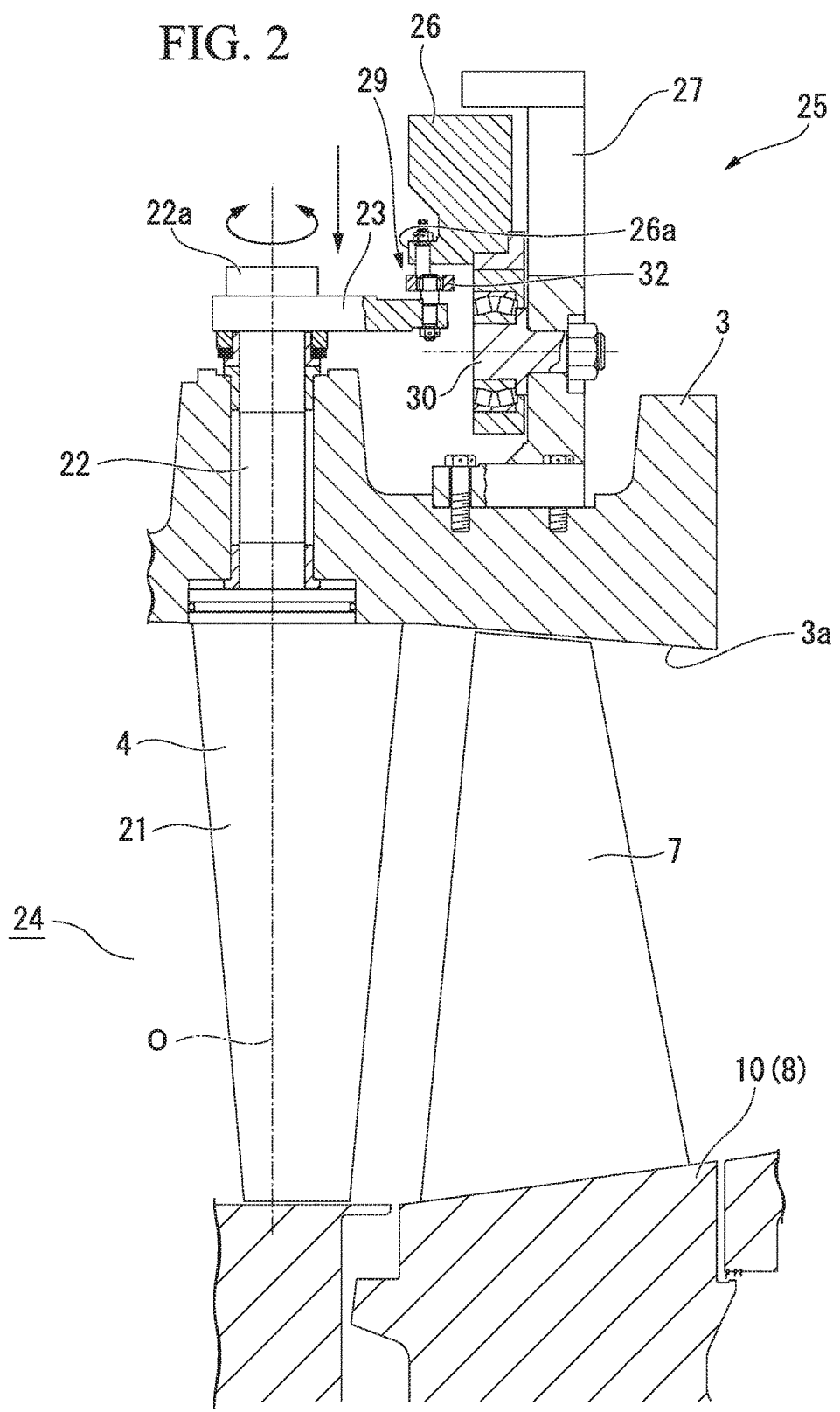
FIG. 2 is an enlarged view of a variable vane in the embodiment of the present invention.
Figure 3:
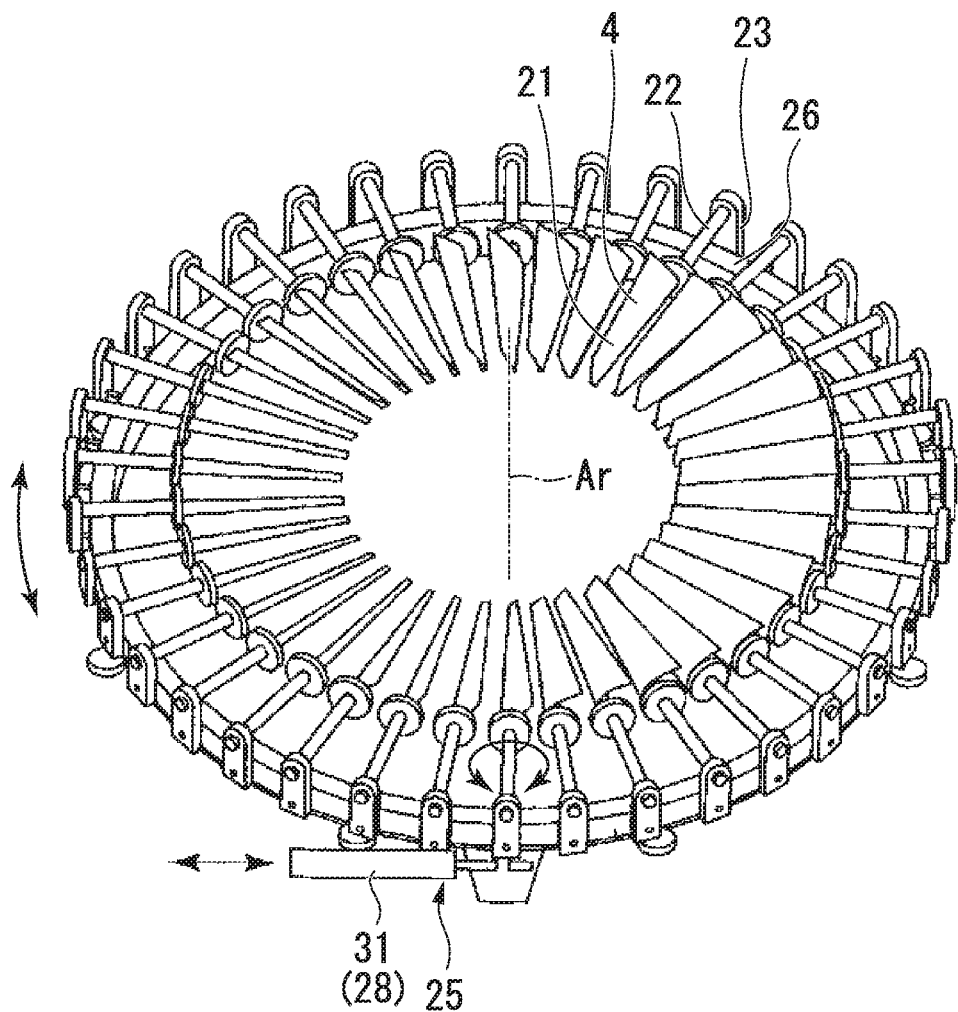
FIG. 3 is a perspective view of a vane ring of the variable vane in the embodiment of the present invention.

FIG. 2 is an enlarged view of the variable vane in the embodiment of the present invention. FIG. 3 is a perspective view of a vane ring of the variable vane in the embodiment of the present invention. In FIG. 3, for convenience of illustration, a case where a movable ring 26 is disposed further toward the inside in the radial direction than an arm 23 is shown.

As shown in FIGS. 1 to 3, the vane 4 which is a variable vane includes a vane main body 21, a rod 22, and the arm 23.

The vane main body 21 is disposed in a fluid flow path 24 in the casing 3. The vane main body 21 in this embodiment has a vane profile which becomes gradually thinner toward the inside in the radial direction from an inner peripheral surface 3a of the casing 3.

The rod 22 is a part which is a rotary shaft for changing a vane angle of the vane main body 21. The rod 22 is formed in the form of a column having a circular cross section and extending linearly on the extension of the rotation center of each vane main body 21. The rod 22 penetrates the casing 3 toward the outside from the inside. An end portion 22a on the outside in the radial direction of the rod 22 is exposed to the outside of the casing 3. The rod 22 is rotatably supported by a bearing part (not shown) provided at the casing 3.

The arm 23 is integrally fixed to the rod 22 outside of the casing 3. The arm 23 extends toward a predetermined outside in the radial direction from each rod 22. The arms 23 of the same vane stage extend toward the same direction from the respective rods 22. That is, the arm 23 rotates along with the rod 22, whereby it becomes possible to adjust the vane angle of the vane main body 21.

The axial flow compressor 1 in this embodiment further includes a variable vane drive mechanism 25 for each of the first to fourth vane stages 4a to 4d. The variable vane drive mechanism 25 adjusts the vane angles of the plurality of vanes 4 in the same vane stage in the first to fourth vane stages 4a to 4d at the same time so as to become the same angle. The variable vane drive mechanism 25 includes the movable ring 26, a ring support mechanism 27, a rotary drive mechanism 28, and a link mechanism 29.

The movable ring 26 is a member which is formed in the form of a ring which is disposed outside of the casing 3. The tip of the arm 23 described above is linked with the movable ring 26 in a state of being rotatable around an axis of rotation extending in the radial direction.

The ring support mechanism 27 supports the movable ring 26 so as to be rotatable around the axis Ar of the rotor 2 as a rotation center. The ring support mechanism 27 extends toward the outside in the radial direction from the casing 3. A plurality of ring support mechanisms 27 is disposed at intervals in a circumferential direction of the movable ring 26. The ring support mechanism 27 in this embodiment includes rollers 30 supporting the movable ring 26 from the inside in the radial direction.

These rollers 30 support the movable ring 26 in a state of being able to be displaced only in the circumferential direction while restricting the displacement of the movable ring 26 in the radial direction and the direction of the axis Ar.

The rotary drive mechanism 28 is a mechanism for rotating the movable ring 26 around the axis Ar of the rotor 2.

More specifically, the rotary drive mechanism 28 rotates the movable ring 26 in the circumferential direction between a fully open position corresponding to a vane angle at which the vane 4 enters a predetermined fully open state, and a fully closed position corresponding to a vane angle at which the vane 4 enters a predetermined fully closed state.

The rotary drive mechanism 28 may include, for example, a linearly reciprocable actuator 31 as a drive source for rotating the movable ring 26. In this case, by linking the actuator 31 and the movable ring 26 with each other, it is possible to make the rotational position of the movable ring 26 a position in accordance with the actuated position of the actuator 31. The actuator 31 can make the rotational position of the movable ring 26 an actuated position in accordance with an operation situation by a control device (not shown) based on a predetermined map, table, mathematical expression, or the like.

Here, in the axial flow compressor 1 described above, a case has been described where the rotary drive mechanism 28 is provided for each of the first to fourth vane stages 4a to 4d, thereby individually rotating the movable ring 26 of each stage of the first to fourth vane stages 4a to 4d. However, there is no limitation to the above configuration. For example, a configuration may be made such that two or more vane stages among the second vane stage 4b to the fourth vane stage 4d except for the first vane stage 4a functioning as an inlet guide vane form one set and the rotational positions of the respective movable rings 26 in a set of vane stages are synchronized. The second vane stage 4b to the fourth vane stage 4d may be made such that driving can be individually controlled without synchronizing the rotational positions of the respective movable rings 26.

Figure 4:
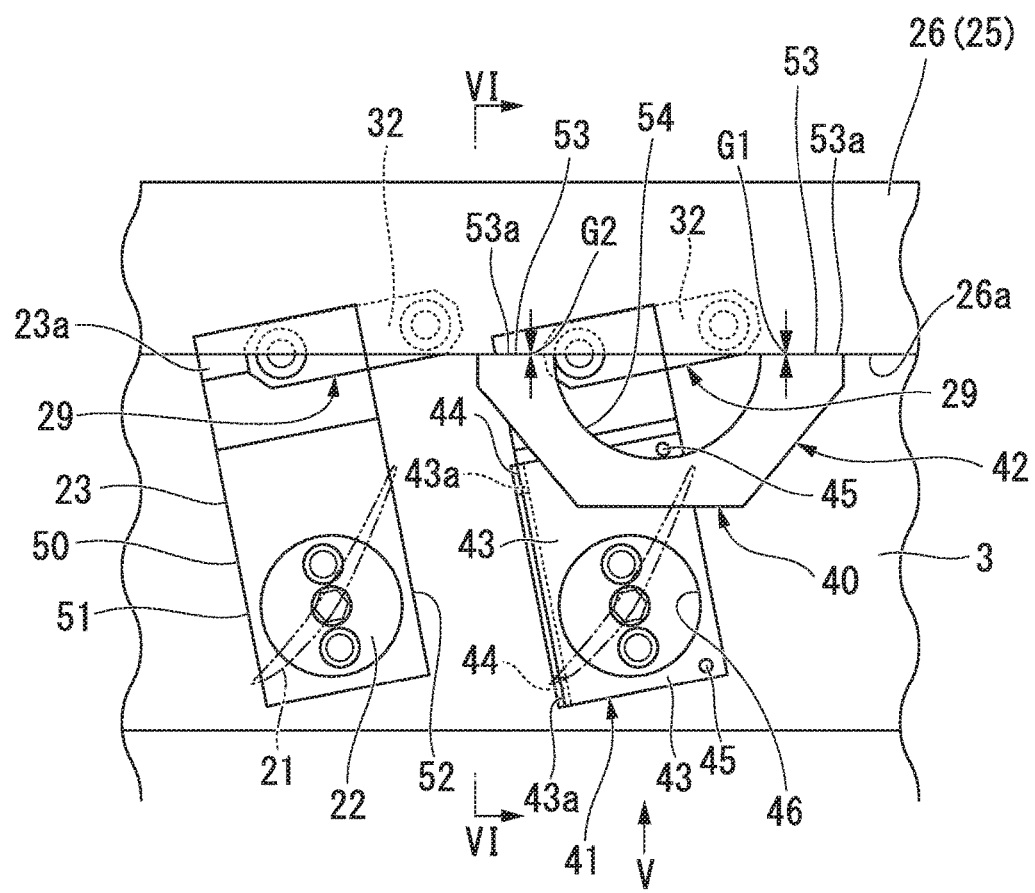
FIG. 4 is a view when a rod in the embodiment of the present invention is viewed from the outside in a radial direction.

FIG. 4 is a view when the rod 22 in the embodiment of the present invention is viewed from the outside in the radial direction.

As shown in FIGS. 2 and 4, the link mechanism 29 transmits the force of the movable ring 26 acting in the circumferential direction of the casing 3 to a tip portion 23a of the arm 23 which is displaced in a circular orbit around the axis Ar in the radial direction. The link mechanism 29 includes a link piece 32 which connects the movable ring 26 of each vane stage and the tip portion 23a of the arm 23. The link piece 32 is supported on the arm 23 and the movable ring 26 so as to be rotatable around an axis O (refer to FIG. 2) which is directed in the radial direction. In this way, if the movable ring 26 rotates, the link piece 32 pushes and pulls the arm 23, thereby rotating the arm 23 according to the amount of rotation of the movable ring 26.

That is, according to the axial flow compressor 1 of the embodiment described above, by rotating the movable ring 26 by the rotary drive mechanism 28, it is possible to make the vane angle of the vane main body 21 an angle in accordance with the rotational position of the movable ring 26 through the link mechanism 29, the arm 23, and the rod 22. In the axial flow compressor 1 of the embodiment, in order to adjust a suction flow rate or the like according to operation conditions or the like during the period from the time of the start of start-up thereof to the time of stop, the vane angles of the first vane stage 4a to the fourth vane stage 4d are appropriately changed by a control device (not shown).

Next, a measurement jig in this embodiment will be described based on the drawings.

Figure 5:
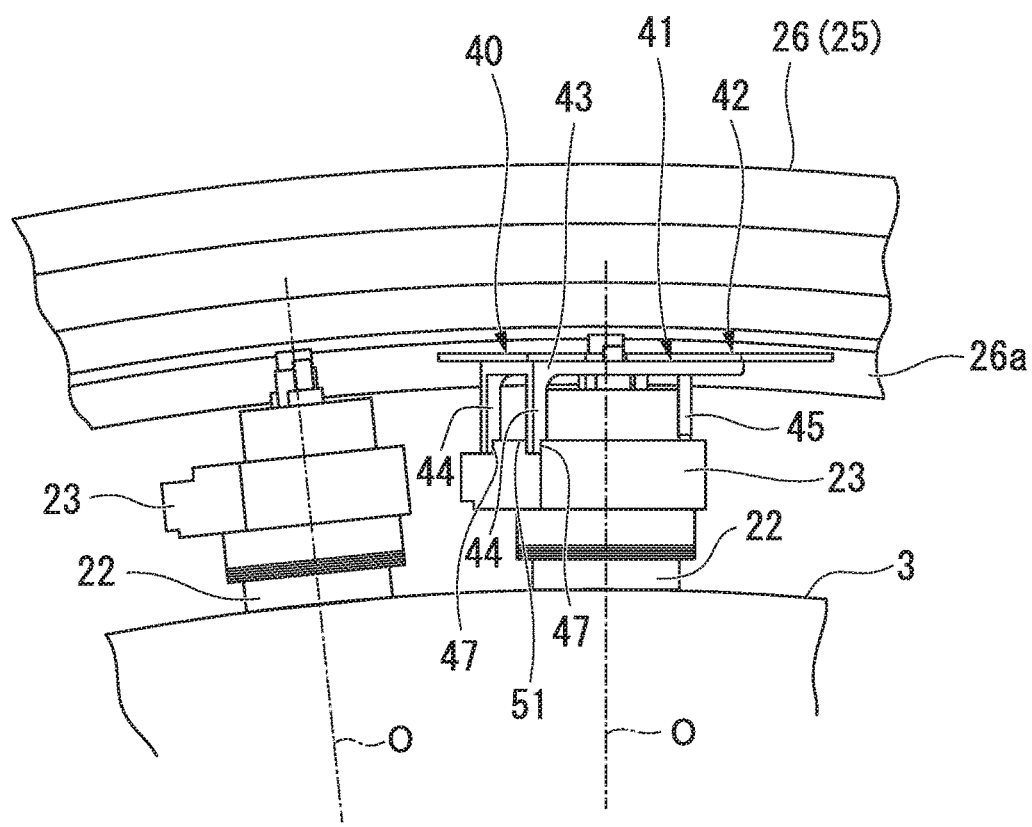
FIG. 5 is a view when a mounted state of a measurement jig in the embodiment of the present invention is viewed from the direction of an arrow V of FIG. 4.
Figure 6:
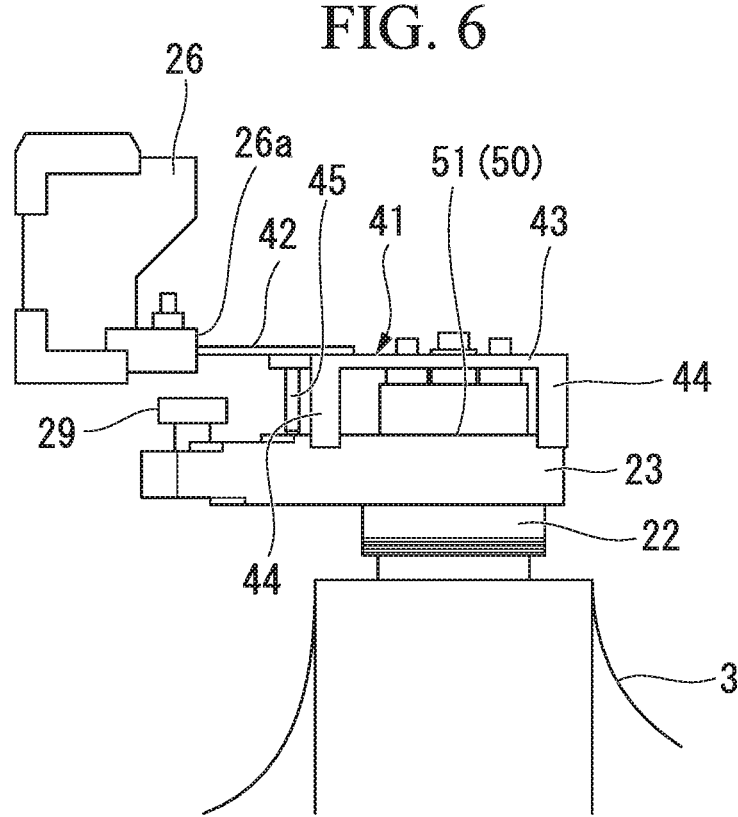
FIG. 6 is a sectional view taken along line VI-VI of FIG. 4.
Figure 7:
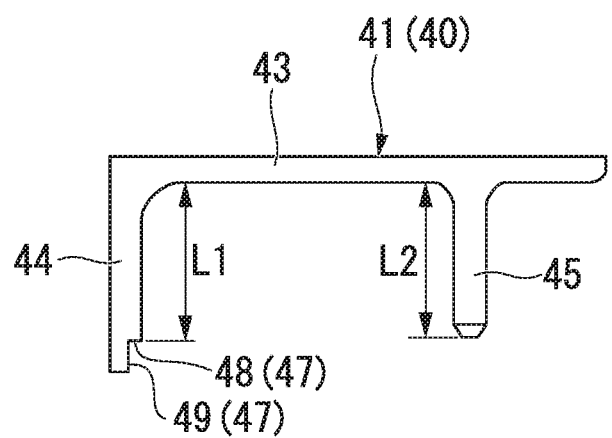
FIG. 7 is a side view of a guide part of the measurement jig in the embodiment of the present invention.

FIG. 5 is a view when a mounted state of the measurement jig in the embodiment of the present invention is viewed from the direction of an arrow V of FIG. 4. FIG. 6 is a sectional view taken along line VI-VI of FIG. 4. FIG. 7 is a side view of a guide part of the measurement jig in the embodiment of the present invention.

As shown in FIGS. 4 to 7, a measurement jig 40 in this embodiment is a jig for measuring the vane angle of each vane 4 in the first vane stage 4a to the fourth vane stage 4d which is a variable vane. The measurement jig 40 includes a guide part 41 and a facing part 42. The guide part 41 is detachably mounted on the arm 23 described above. The guide part 41 is mounted on the arm 23 in a fixed posture in at least a rotation direction of the arm 23. Here, the fixed posture in the rotation direction of the arm 23 means that the relative angle between the arm 23 and the guide part 41 is maintained in a constant state in the rotation direction of the arm 23. That is, if the arm 23 rotates, the guide part 41 is also displaced by the same angle along with the arm 23.

The guide part 41 is mounted so as to be pressed against the base side of the arm 23. The guide part 41 includes a main plate portion 43, a leg portion 44, and a pin portion 45. The main plate portion 43 is formed in the form of a plate slightly larger than the arm 23 when viewed in a planar view. More specifically, the main plate portion 43 is formed in the form of a rectangular flat plate having a width slightly larger than that of the rectangular arm 23 when viewed in a planar view. The main plate portion 43 is provided with a through-hole 46 on the extension (in other words, at a position on the outside in the radial direction) of the rod 22 described above. The through-hole 46 has an inner diameter equal to the diameter of the rod 22. Due to the through-hole 46, interference between a member such as a bolt protruding from the rod 22 to the outside in the radial direction and the main plate portion 43 is avoided.

The leg portion 44 comes into contact with the arm 23, thereby making the relative position of the guide part 41 in the rotation direction always constant with respect to the arm 23. A plurality of leg portions 44 is provided. The guide part 41 in this embodiment includes two leg portions 44. These leg portions 44 extend toward the arm 23 from the side of a first long side 50 out of two long sides of the main plate portion 43. These leg portions 44 are disposed so as to be spaced apart from each other in an extending direction of the first long side 50. Each of the leg portions 44 in this embodiment extends from a corner portion 43a of the rectangle of the main plate portion 43 to the arm 23 side.

The leg portion 44 has, at the tip thereof, a recessed portion 47 (refer to FIGS. 5 and 7) corresponding to the shape of an upper edge portion of the arm 23 which includes the first long side 50. The recessed portion 47 includes a first facing surface 48 facing the upper surface of the arm 23 parallel thereto, and a second facing surface 49 facing the side surface of the arm 23 parallel thereto. A corner portion 51 which is formed by the upper surface and the side surface of the arm 23 on the first long side 50 side is fitted into the recessed portions 47. The corner portion 51 of the arm 23 is fitted into the recessed portion 47, whereby the tip of the leg portion 44 is positioned with respect to the corner portion 51 of the arm 23 in the width direction of the arm 23 and the radial direction.

The pin portion 45 maintains a constant distance of the main plate portion 43 with respect to the arm 23. The guide part 41 in this embodiment includes two pin portions 45. These pin portions 45 are disposed so as to be spaced apart from the leg portions 44 in a short side direction of the guide part 41. These pin portions 45 are disposed so as to be spaced apart from each other in an extending direction of a second long side 52 of the arm 23. In this embodiment, a male screw is formed at a base of the pin portion 45, and the male screw is screwed into a female screw formed in the main plate portion 43, whereby the pin portion 45 is fixed to the main plate portion 43.

Each of these pin portions 45 is formed in the form of a column extending toward the arm 23 from the second long side 52 side of the main plate portion 43. The tip of the pin portion 45 is reduced in diameter toward the upper surface of the arm 23, and the end face thereof is made so as to be able to come into contact with the upper surface of the arm 23. The length of the pin portion 45 is a length L2 equal to a length L1 from the base of the leg portion 44 described above to the first facing surface 48. That is, the guide part 41 is mounted on the arm 23, whereby the upper surface of the arm 23 and the main plate portion 43 of the guide part 41 become parallel to each other.

The facing part 42 is a part for measuring the angle of the arm 23 with respect to a side surface 26a (an angle reference surface) of the movable ring 26. The facing part 42 is formed in the form of a plate parallel to the guide part 41. The facing part 42 is fixed to the movable ring 26 side of the guide part 41 described above (in other words, the tip portion 23a side of the arm 23) by welding or the like. The facing part 42 includes a contact portion 53 (refer to FIG. 4) which comes into contact with the side surface 26a of the movable ring 26 parallel thereto in a case where there is no deviation of the vane angle in the vane main body 21.

The contact portion 53 of this embodiment has a contact surface 53a which becomes parallel to the side surface 26a of the movable ring 26 in a case where there is no deviation of the vane angle in the vane main body 21. Here, a case where the side surface 26a of the movable ring 26 is used as an angle reference surface for the facing part 42 has been described. However, the angle reference surface is not limited to the side surface 26a. It is acceptable if the angle reference surface is a surface which intersects the rotation direction of the arm 23 and of which the distance to the rod 22 does not change at the time of the rotation of the arm 23. As the angle reference surface, for example, a predetermined surface formed at the casing 3 or a member around the casing 3 may be appropriately used as the angle reference surface. In this embodiment, an example is shown in which a planar surface is adopted as the angle reference surface and a planar surface is also adopted as the contact surface 53a. However, the angle reference surface and the contact surface 53a are not limited to a planar surface.

The facing part 42 has two contact portions 53 provided with a distance therebetween in the circumferential direction of the movable ring 26. The facing part 42 has a recessed portion 54 between these two contact portions 53. The recessed portion 54 is provided, whereby, for example, even in a case where a projection is formed on the side surface 26a of the movable ring 26, it is possible to reduce the probability that the contact portion 53 will come into contact with the projection. Here, in the facing part 42 of the embodiment described above, a case where the contact portion 53 comes into contact with the angle reference surface with a planar surface has been described. However, for example, the contact may be made at a side. Further, in a case where the contact portions 53 are provided at two places, as in the embodiment described above, the contact portion 53 may be formed so as to come into contact with the angle reference surface at a point. Further, in a case where the contact portion 53 comes into contact with the angle reference surface with a surface, the recessed portion 54 may be omitted.

As the measurement jig 40 in this embodiment, a measurement jig for fully open position, which is used in a case where the vane 4 is at a fully open position, and a measurement jig for fully closed position, which is used in a case where the vane 4 is at a fully closed position are provided in advance. The measurement jig for fully open position and the measurement jig for fully closed position are different from each other only in terms of the mounting angle of the facing part 42 with respect to the guide part 41. Here, the mounting angle of the facing part 42 with respect to the guide part 41 is an angle in the rotation direction of the arm 23. FIG. 4 shows an example of the measurement jig for fully open position.

The measurement jig 40 in this embodiment has the configuration described above. Next, a method of measuring the angle of the vane 4 by using the measurement jig 40 will be described.

Figure 8:
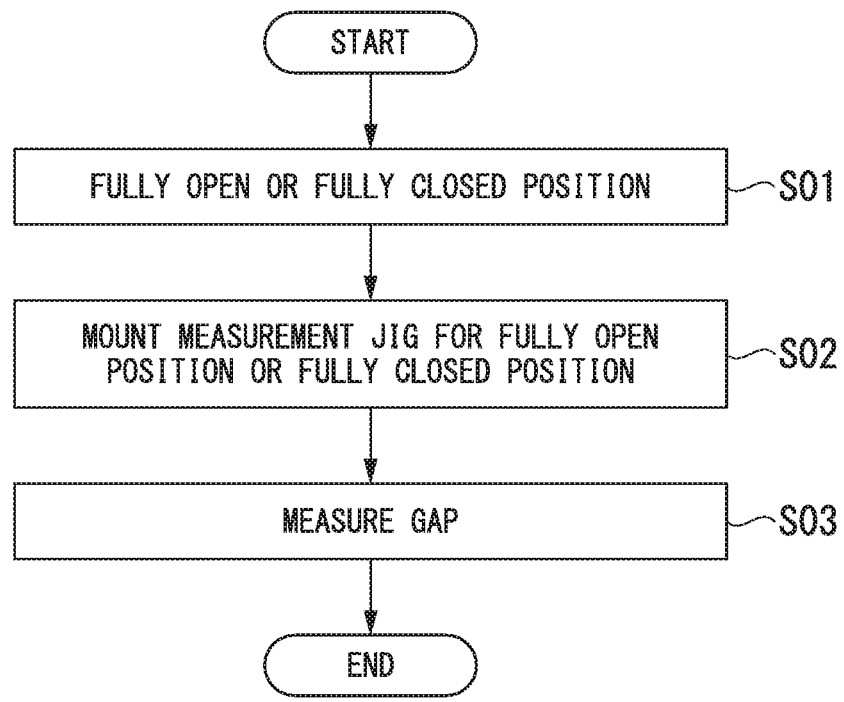
FIG. 8 is a flowchart showing the procedure of an angle measurement method in the embodiment of the present invention.

FIG. 8 is a flowchart showing the procedure of an angle measurement method in the embodiment of the present invention. The angle measurement method can be performed at the time of for example, the assembly adjustment, the final shipping inspection, the periodic check, or the like of the axial flow compressor 1.

As shown in FIG. 8, first, the arm 23 is placed at the fully open position at which the vane main body 21 is fully opened, or the fully closed position at which the vane main body 21 is fully closed (Step S01).

Subsequently, in a case where the arm 23 has been placed at the fully open position, the guide part 41 of the measurement jig for fully open position is pressed against the arm 23. On the other hand, in a case where the arm 23 has been placed at the fully closed position, the guide part 41 of the measurement jig for fully closed position is pressed against the arm 23 (Step S02; a jig mounting step). Further, if necessary, the measurement jig 40 is slid to the movable ring 26 side in a state where the guide part 41 is pressed against the arm. In this way, a state where the facing part 42 and the side surface 26a of the movable ring 26 reliably come into contact with each other is created.

Thereafter, gaps G1 and G2 (refer to FIG. 4) between the contact portions 53 of the measurement jig 40 and the side surface 26a of the movable ring 26, which is the angle reference surface, are measured (Step S03; a measurement step). Here, a thickness gauge or the like can be used for the measurement of the gaps G1 and G2. In a case where deviation has occurred in the vane angle, either of the gap G1 or the gap G2 becomes larger than "0". For example, like an angle error of 0.1° in a case where the gap G1 is 0.4 mm and the gap G2 is 0 mm, it is possible to find an angle error according to the size of the gap between the contact portion 53 on one side, out of the two contact portions 53, and the side surface 26a of the movable ring 26.

Therefore, according to the embodiment described above, it is possible to mount the measurement jig 40 on the arm 23 which is disposed outside of the casing 3 and measure the relative angle between the side surface 26a of the movable ring 26 and at least a portion of the measurement jig 40. For this reason, it is possible to estimate the relative angle between the vane main body 21 and the side surface 26a of the movable ring 26, which is the angle reference surface. As a result, it is possible to easily measure the vane angle of the variable vane, and thus it is possible to reduce the burden on a worker.

Further, it is possible to estimate the amount of deviation of the vane angle of the vane main body 21 according to the sizes of the gaps G1 and G2 between the facing part 42 and the side surface 26a of the movable ring 26. As a result, it is possible to estimate the amount of deviation of the vane angle with satisfactory accuracy and ease.

Further, by mounting the guide part 41 on the arm 23 and measuring the gaps G1 and G2 between the side surface 26a of the movable ring 26 and the facing part 42, it is possible to estimate the amount of deviation of the vane angle of the vane main body 21. As a result, it is possible to easily measure the vane angle of the variable vane, and thus it is possible to reduce the burden on a worker.

Further, the facing part 42 has a side or a surface which comes into contact with the side surface 26a of the movable ring 26 parallel thereto, and therefore, the facing part 42 can be stably brought into contact with the angle reference surface. As a result, the reliability of the amount of deviation of the measured vane angle can be improved.

The present invention is not limited to the above-described embodiment and includes various changes applied to the above-described embodiment within a scope which does not depart from the gist of the present invention. That is, specific shapes, configurations, or the like mentioned in the embodiment are merely an example, and changes can be appropriately made.

For example, in the embodiment described above, the measurement method of estimating the vane angle of the vane main body 21 by using only the measurement jig 40 which is used outside the casing 3 has been described as an example. However, there is no limitation to this method. For example, the measurement jig 40 described above and another measurement jig for directly measuring the vane angle of the vane main body 21 may be used in combination.

Further, in the embodiment described above, a case where the arm 23 and the guide part 41 are formed in a rectangular shape when viewed in a planar view has been described. However, the shapes of the arm 23, the guide part 41, the facing part 42, the link piece 32, and the like are examples, and there is no limitation to the above-described shapes. In the embodiment described above, the through-hole 46 is formed in the main plate portion 43 of the guide part 41. However, in a case where the main plate portion 43 does not interfere with a member protruding from the end face of the rod 22, the through-hole 46 may be omitted.

Further, in the embodiment described above, a case where the leg portion 44 is formed in a rectangular columnar shape has been illustrated. However, the leg portion 44 is not limited to a rectangular columnar shape or a columnar shape. For example, the leg portion 44 may also be formed in the form of a plate extending along the first long side 50 of the arm 23. In this manner, in a case where the leg portion 44 is formed in the form of a plate, it is possible to stably dispose the leg portion 44 along the first long side 50, and therefore, only one leg portion 44 may be provided. Further, the pin portion 45 is also not limited to a circular columnar shape or a columnar shape. Similarly to the leg portion 44, for example, the pin portion 45 may also be formed in the form of a plate extending in a direction of the second long side 52.

Further, in the embodiment described above, the axial flow compressor 1 has been illustrated as the axial flow fluid machine. However, the present invention can also be applied to an axial flow fluid machine such as a turbine other than the axial flow compressor 1.

INDUSTRIAL APPLICABILITY

The present invention can be applied to an angle measurement method and an angle measurement jig, and makes it possible to easily measure the vane angle of the variable vane and thus to reduce the burden on a worker. Further, a significant increase in the number of regular inspection days due to opening a casing can be suppressed, and thus it becomes possible to shorten stoppage periods of a plant using an axial flow compressor.

REFERENCE SIGNS LIST

1: axial flow compressor
2: rotor
3: casing
3a: inner peripheral surface
4: vane
5: vane
6: rotor main body
7: blade
8: integrated disk part
9: split disk part
10: large-diameter portion
11: first end portion
12: rotor disk
13: second end portion
14: outer peripheral portion
15: suction port
21: vane main body
22: rod
23: arm
23a: tip portion
24: fluid flow path
25: variable vane drive mechanism
26: movable ring
26a: side surface
27: ring support mechanism
28: rotary drive mechanism
29: link mechanism
30: roller
31: actuator
32: link piece
40: measurement jig
41: guide part
42: facing part
43: main plate portion
44: leg portion
45: pin portion
46: through-hole
47: recessed portion
48: first facing surface
49: second facing surface
50: first long side
51: corner portion
52: second long side
53: contact portion
53a: contact surface
54: recessed portion

What is claimed is:

1. An angle measurement method which is a method of measuring an angle of a variable vane of an axial flow fluid machine including:
- a vane main body which is disposed inside of a casing; and
- an arm which is disposed outside of the casing and rotates integrally with the vane main body, the angle measurement method comprising:
- a jig mounting step of mounting a measurement jig configured to measure an angle of the vane main body on the arm in a fixed posture in a rotation direction of the arm; and
- a measurement step of measuring a relative angle between a predetermined angle reference surface intersecting the rotation direction of the arm and at least a portion of the measurement jig, wherein in the measurement step, a gap between a facing part of the measurement jig, which comes into contact with the predetermined angle reference surface intersecting the rotation direction of the arm and is parallel thereto in a case where there is no deviation of a vane angle in the vane main body, and the angle reference surface is measured.

2. An angle measurement jig for measuring an angle of a variable vane of an axial flow fluid machine including:
- a vane main body which is disposed inside of a casing; and
- an arm which is disposed outside of the casing and rotates integrally with the vane main body, the angle measurement jig comprising:
- a guide part which is capable of being mounted on the arm in a fixed posture in at least a rotation direction of the arm; and
- a facing part which comes into contact with a predetermined angle reference surface intersecting the rotation direction of the arm and is parallel thereto in a case where there is no deviation of a vane angle in the vane main body, wherein the facing part includes a side or a surface which comes into contact with the angle reference surface and is parallel thereto in a case where there is no deviation of a vane angle in the vane main body.

* * * * *